Feb. 18, 1958  E. W. SEEGER  2,824,265
ELECTRICAL SPEED DETECTION SYSTEM
Filed Dec. 22, 1952
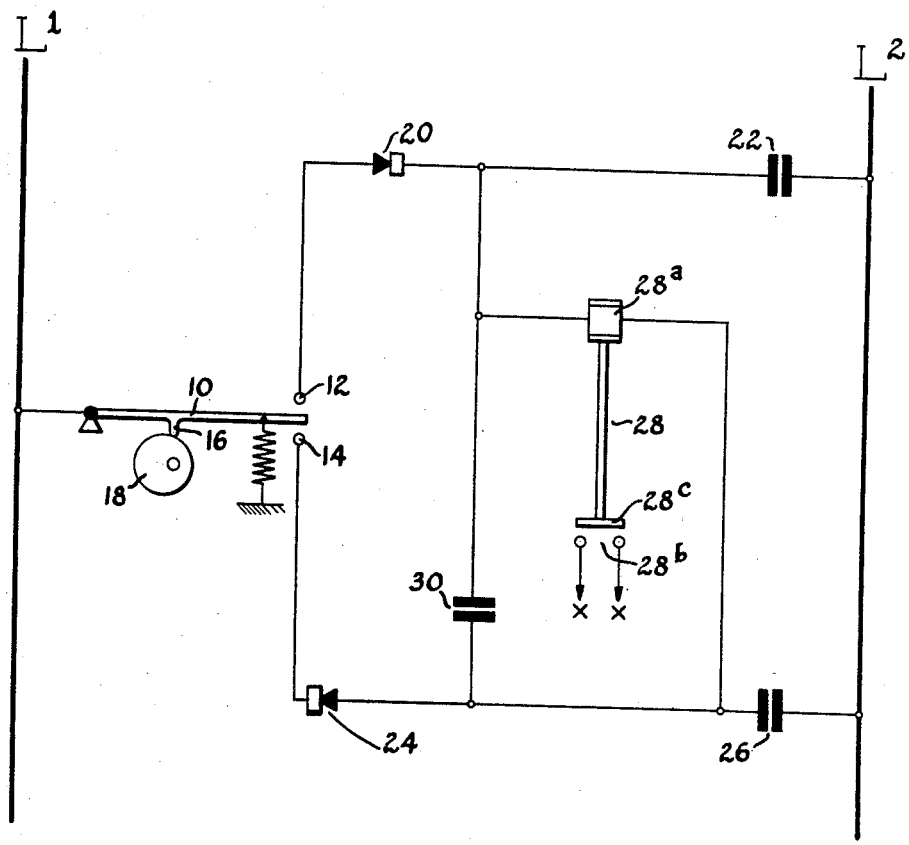
Inventor
Edwin W. Seeger
By W. E. Lyon
Attorney

United States Patent Office 2,824,265
Patented Feb. 18, 1958

2,824,265
ELECTRICAL SPEED DETECTION SYSTEM

Edwin W. Seeger, Wauwatosa, Wis., assignor to Cutler-Hammer, Inc., Milwaukee, Wis., a corporation of Delaware Application December 22, 1952, Serial No. 327,328

3 Claims. (Cl. 317—151)

The present invention relates to electrical speed detection systems, and more particularly to systems for the detection of given speeds in variable speed devices.

A primary object of the invention is to provide such a system which is reliable in operation and inexpensive to manufacture.

Another and equally important object is to provide such a system which is adapted for incorporation with a wide variety of control systems and devices.

A more specific object is to provide such a system for the detection of zero speed in various apparatus.

Other objects and advantages of the invention will hereinafter appear.

A preferred embodiment of the invention is illustrated somewhat schematically and somewhat diagrammatically in the accompanying drawing, it being understood that the system shown is suceptible of various modifications without departing from the scope or spirit of the invention as defined in the appended claims.

Referring to the drawing, the system there illustrated comprises a pair of supply lines $L^1$ and $L^2$ for connection to an alternating current source of power. Connected to line $L^1$ is the conducting arm 10 of a single-pole, double-throw switch which comprises, in addition, stationary contacts 12 and 14. The switch actuating mechanism selected for illustration includes, as a part of arm 10, a cam follower 16 which rides upon a rotating cam 18. Upon rotation cam 18 imparts a cyclic, oscillatory motion to arm 10, causing it to make connection alternately with contacts 12 and 14.

Contact 12 is connected to line $L^2$ through the series circuit combination of a half-wave rectifying element 20 and a capacitor 22. Contact 14 is connected to line $L^2$ through the series circuit combination of a half-wave rectifying element 24 and a capacitor 26. The rectifiers 20 and 24 are connected in inverse directions of conductivity with respect to the supply lines $L^1$ and $L^2$.

Bridging the connection between rectifier 20 and capacitor 22 with the connection between rectifier 24 and capacitor 26, is the operating winding 28a of an electro-magnetic relay 28. The relay is provided with contacts 28b which may be normally open or normally closed according to the requirements of a control system including contacts 28b at X—X. In addition, a smoothing capacitor 30 may be connected, as shown, in parallel with winding 28a to reduce chattering of the relay when the oscillation frequency of arm 10 is low.

In operation cam 18 is rotated, and thus arm 10 is oscillated, at a speed which is equal or proportional to the speed of a device, some given speed of which is to be detected. When zero speed is to be detected, the degree of proportionality is normally selected so that arm 10 will always be oscillated at a lower frequency than that of the alternating current supply.

During the period when line $L^1$ is positive with respect to line $L^2$ and arm 10 is in contact with contact 12, capacitor 22 is charged to a higher or positive potential with respect to line $L^2$ through rectifier 20. When line $L^1$ is negative with respect to line $L^2$ and arm 10 is in contact with contact 14, capacitor 26 is charged through rectifier 24 to a lower or negative potential with respect to line $L^2$.

Capacitors 22 and 26 are connected in series with one another across winding 28a so that their respective potentials are additive, and so that together they discharge unidirectional current through winding 28a and maintain relay 28 in an energized condition. These capacitors have sufficiently large capacitance, and winding 28a has sufficient impedance, to make the time constant of the discharge path large. As long as arm 10 continues to oscillate it will make contact with contacts 12 and 14 at times when the supply lines have proper polarity to cause charging current to flow into capacitors 22 and 26 thereby renewing and maintaining their charge. Thus the flow of current in winding 28a will continue as long as arm 10 oscillates.

When arm 10 comes to rest, however, the current flow will cease, relay 28 will be de-energized, and normally open contacts 28b will be opened. This action is not dependent upon the position in which arm 10 comes to rest. If the arm stops intermediate contacts 12 and 14, capacitors 22 and 26 will completely discharge; but if it comes to rest in contact with either contact 12 or 14, capacitors 22 and 26 will be charged to equal, like potentials. In either event, current will cease flowing in winding 28a.

The system is applicable for use with a wide variety of control systems in which the detection of a given speed, and especially zero speed, is required. The invention may be used, for example, in systems for plugging motors or with interlock circuits for use with conveyors, rotating or oscillating laundry equipment and other apparatus.

The single-pole, double-throw switch and cam illustrated and described is intended to be representative only. While such an arrangement is suitable for some applications it will be readily apparent that various other well known types of actuators, commutating devices and the like may be used in other applications of the invention. Since it is immaterial whether arm 10 comes to rest between or in contact with one of contacts 12 or 14, the duration of the open period of the switch is not critical.

When the invention is used to detect speeds other than zero speed, it is required only that arm 10 or its equivalent be operated at substantially the frequency of the alternating current source of supply when the variable speed device has the speed to be detected, and further that arm 10 contact, in each half cycle of the power source, that rectifier connected to prevent the flow of current from the source.

I claim:

1. A system for detecting a given speed in a variable speed device, comprising, an alternating current source of supply, a pair of rectifiers, means to connect said rectifiers alternately to one side of said source at a frequency proportional to the speed of said device, an electro-responsive indicating element, and a pair of capacitors connected to the other side of said source and to said rectifiers to be charged individually through a respectively associated one of said rectifiers, said capacitors further being connected to said indicating element to be discharged in series therethrough, and said rectifiers being relatively oppositely poled.

2. The system defined in claim 1, in which said indicating element is the operating winding of an electro-magnetically operated switch.

3. A system for detecting zero speed in a variable speed device, comprising an alternating current source of supply, an electro-responsive device having an operating element, a pair of capacitors each having one terminal thereof connected in common to one side of said source, a pair of half-wave rectifiers each having one terminal thereof connected to a respectively associated terminal of said element and to the other terminal of a respectively associated one of said capacitors, and switch means operative to connect alternately the respective other terminals of said rectifiers to the other side of said source at a frequency dependent upon the speed of said device, said rectifiers being connected to be relatively oppositely conductive.

References Cited in the file of this patent

UNITED STATES PATENTS

| | | |
|---|---|---|
| 2,298,956 | Mason | Oct. 13, 1942 |
| 2,427,751 | Snyder | Sept. 23, 1947 |
| 2,473,542 | Philpott | June 21, 1949 |
| 2,486,240 | Armstrong | Oct. 25, 1949 |
| 2,523,297 | Hastings | Sept. 26, 1950 |
| 2,530,749 | Yardeny | Nov. 21, 1950 |
| 2,635,197 | Routledge | Apr. 14, 1953 |